May 14, 1957 L. F. FASCHING ET AL 2,792,183
BALE DISINTEGRATING AND SHREDDING APPARATUS
Filed Jan. 31, 1955 2 Sheets-Sheet 1
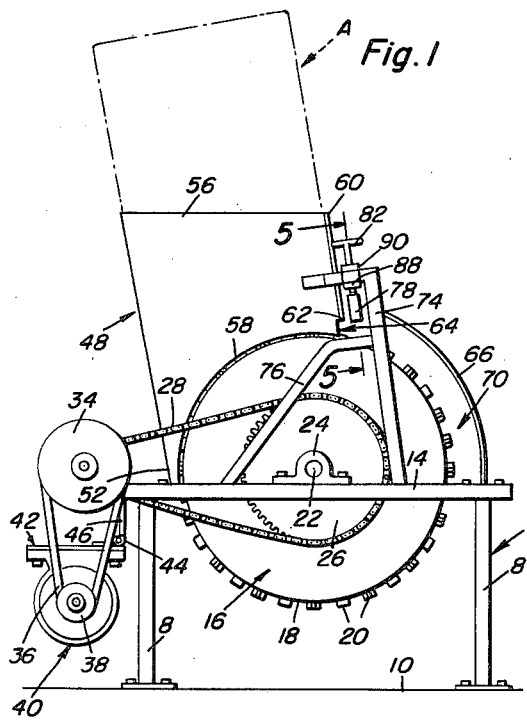
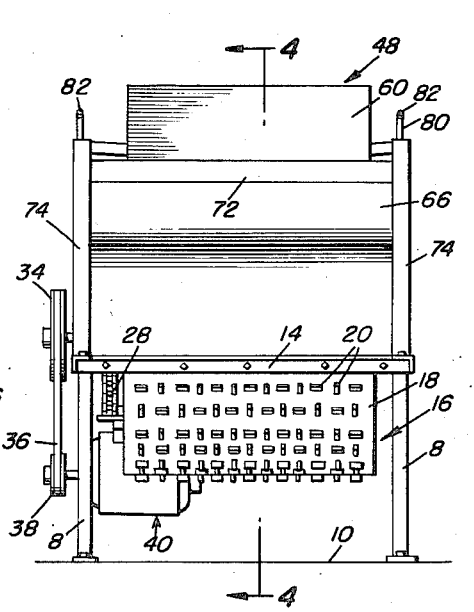
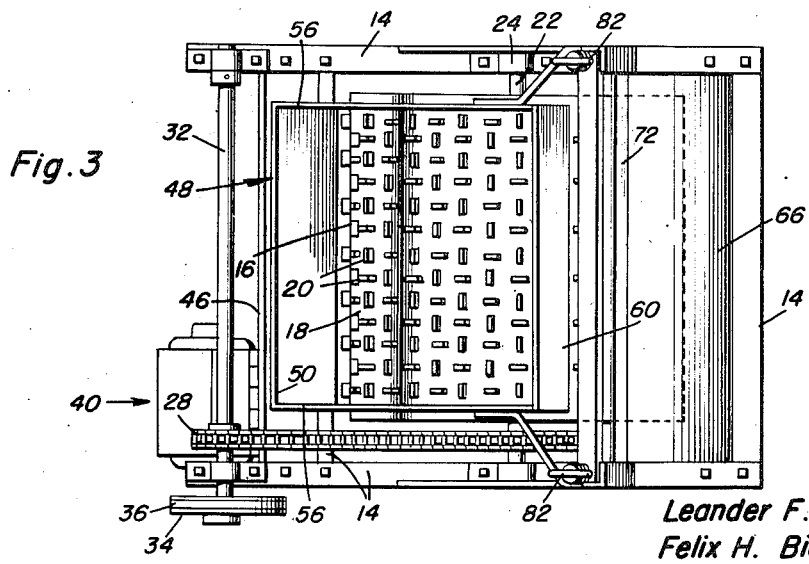
Leander F. Fasching
Felix H. Bickman
INVENTORS.
BY *Clarence A. O'Brien*
*and Harvey B. Jackson*
Attorneys May 14, 1957  L. F. FASCHING ET AL  2,792,183
BALE DISINTEGRATING AND SHREDDING APPARATUS
Filed Jan. 31, 1955  2 Sheets-Sheet 2
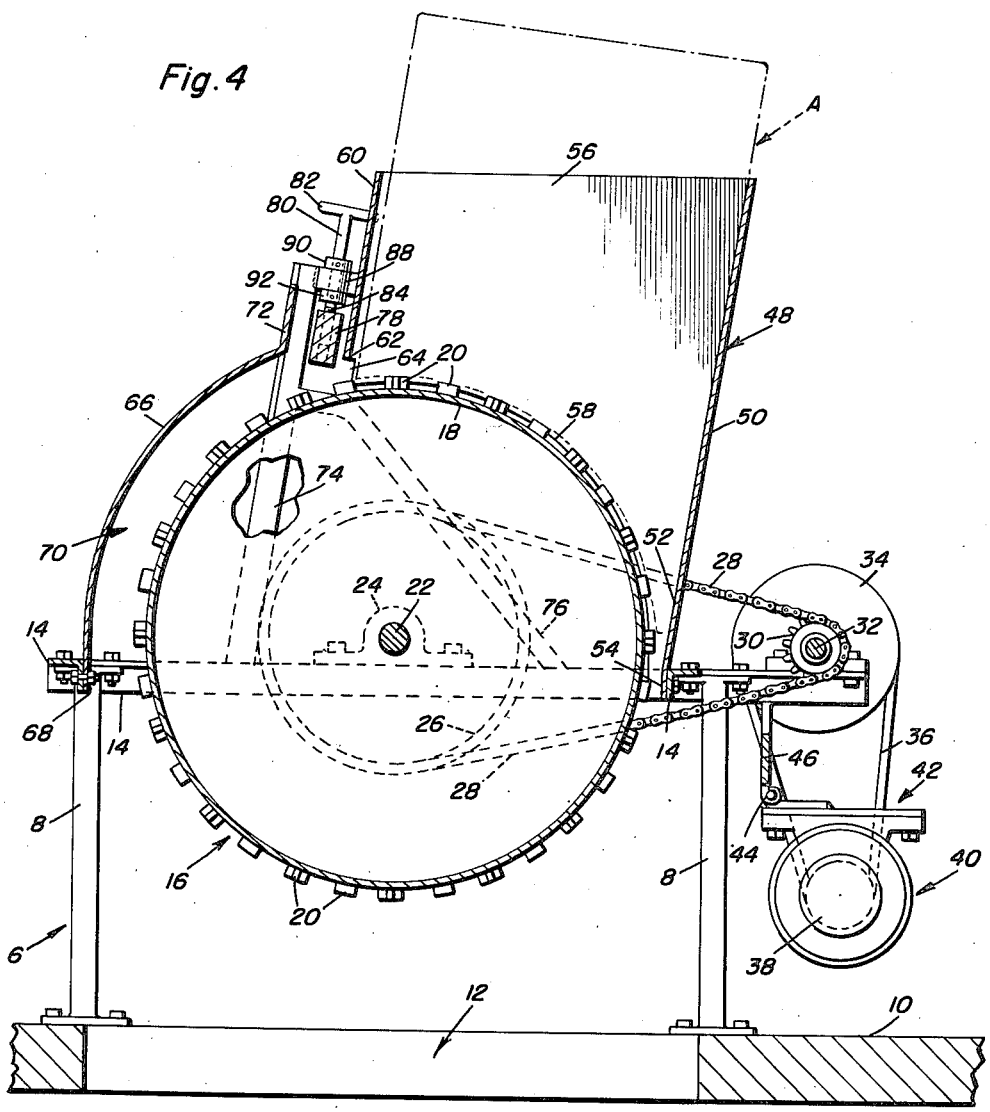
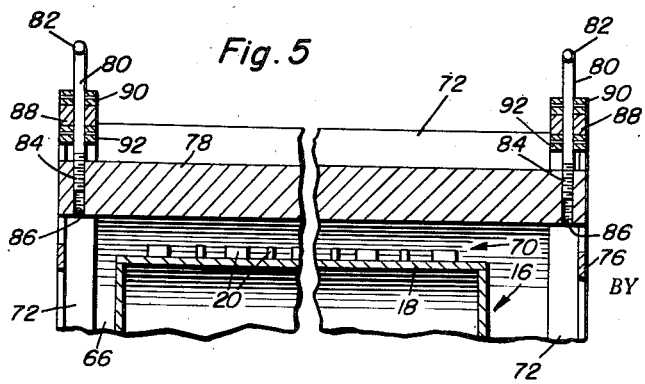
Leander F. Fasching
Felix H. Bickman
INVENTORS.

United States Patent Office 2,792,183
Patented May 14, 1957

2,792,183

BALE DISINTEGRATING AND SHREDDING APPARATUS

Leander F. Fasching and Felix H. Bickman, Winsted, Minn.

Application January 31, 1955, Serial No. 485,078

2 Claims. (Cl. 241—222)

The present invention relates to an apparatus which is expressly designed and constructed to handle and disintegrate a bale and has reference to certain new and useful improvements which cooperate effectually in handily supporting, gravity-feeding and shredding a compressed bale of hay, straw, or the like, this in a manner to loosen and fluff up the disintegrated material for practical and convenient use.

As is generally well known apparatus in the category stated are of various styles and forms and are highly desirable in that they reduce the bale of material to easy-to-handle fluffy form for more efficient feeding, bedding, for example in a barn or stall in a barn so as to eliminate slow, hard and inefficient methods of shaking the material apart by hand and with the use of a pitchfork as is the most commonly followed practice.

With a view toward satisfying certain recognized demands of manufacturers and users, the present invention is characterized by a power driven shredding head. This preferably takes the form of a rotatably mounted horizontally disposed cylinder whose surface is provided with disintegrating teeth. Cooperable with the cylinder, preferably a limited one-quarter areal surface portion, is a substantially vertically disposed receiver which is herein described as a hopper and which confines and delivers the lower end of the bale of hay to the toothed surface of the drum for disintegration and loosening results.

Another object of the invention is to provide a rotatable toothed shredding drum or cylinder whose upper half portion projects above a frame in a support structure and wherein one quarter thereof serves to accommodate the lower open end of the hopper, the other quarter portion having cooperating wall-like shields opposed thereto and arching thereover and suitably spaced to assist in delivering the shredded material on a floor surface or elsewhere for accumulation and use.

A still further object of the invention has to do with the provision of a clearance notch in one short wall of the hopper which defines a discharge slot and which registers with the intake end of the passage defined between the shield and drum, there being a manually regulable gate bar interposed between the notched or slotted wall and shield and functioning as a regulating valve so that the disintegrating step may be more effectually regulated and controlled.

Other objects, features and advantages will become more readily apparent from the following description and the accompanying sheet of illustrative drawings.

In the drawings, wherein like numerals are employed to designate like parts throughout the views:

Figure 1 is an end or side elevation of a bale-accommodating and shredding apparatus constructed in accordance with the principles of the present invention;

Figure 2 is a view which may be treated as a front elevation and which depicts the structure in a direction looking from left to right in Figure 1;

Figure 3 is a top plan view;

Figure 4 is a view in section and elevation and on an enlarged scale taken on the vertical line 4—4 of Figure 2 looking in the direction of the arrows; and Figure 5 is an exaggerated fragmentary detail section on the vertical line 5—5 of Figure 1 looking in the direction of the arrows.

Referring now to the drawings with the aid of lead lines and reference numerals, the aforementioned support means is denoted generally by the numeral 6. This comprises a suitable stand which, in turn, is characterized by what may be treated as a horizontal rectangular frame and supporting legs 8 therefor. The supporting legs are mounted on a floor or other surface 10 which, as brought out in Figure 4, has a discharge opening 12 through which the disintegrated straw or other material, drops for accumulation, storage or use as the case may be. The frame is made up of appropriately arranged and interconnected angle irons 14, as perhaps best shown in Figure 4. It might be stated in this connection that this support means may be attached to and rise from the floor 10. In any event, suitable "support means" 6 is provided for the essential parts, one of which is the horizontally disposed rotatably mounted power-driven shredding head which is here treated as a drum 16. This is preferably of hollow construction and includes cylindrical body portion 18 whose surfaces are provided with shredding teeth 20 of suitable construction and staggered or otherwise arranged. Any number of such teeth may be provided. The drum is mounted on a shaft 22 which, in turn, is rotatable in bearings 24 on the frame of the support means. On one end of the shaft there is a sprocket wheel 26 which serves to accommodate a sprocket chain 28 which is trained over a smaller sprocket wheel 30 operated on the power-driven shaft 32 receiving its power by way of a pulley 34, the shaft being journaled in appropriate bearings. The pulley 34 is driven by a belt 36 receiving its power from a smaller pulley 38 operably mounted on the shaft of the motor or other prime mover 40. As best shown in Figure 4, this motor is mounted on bracket means 42 hinged at 44 on a fixed hanger 46 carried by the frame. Thus, the weight of the motor and hinged bracket means serves to keep the belt 36 under tension.

The receiver for the bale A of hay, straw or the like, is referred to generally by the numeral 48 and as before stated this is more specifically a hopper, preferably one which is vertically disposed and rectangular in cross-section and of a length corresponding approximately to the length of the shredding drum. One wall, which may be designated as the rear wall, of the hopper and denoted by 50 has a lower end portion 52 depending into the space between the frame and the surface of the drum where it is suitably fastened at 54 to one of the frame angle irons 14. The end walls 56 have their lower edges arcuately cut away as at 58 and the curvature conforms to the curvature of the drum and makes for proper cooperation and functioning of the parts. The short front wall 60 has its lower edge notched at 62 with the notch spaced from the surface of the drum and defining what is treated as a discharge slot 64. It will be noticed in Figure 4 that the cross-section of the hopper is such that it not only serves to satisfactorily accommodate the bale of hay, which is dropped therein to gravitate downwardly in an obvious manner, it is proportional with the diameter or circumference of the drum. In fact, it is approximately such that it cooperates with a sector or a one-quarter of the drum as is evident. The numeral 66 designates a suitably bent or arcuate wall which is here treated as a shield and this has its lower end portion 68 appropriately bolted or otherwise fastened to the adjacent angle iron 14 of the frame. The arcuity of the shield is such that it is spaced in approximate parallelism from the surface of the drum where it forms an arcuate passageway 70 which leads to and communicates in spaced relation with the discharge slot 64. The upper end of the shield 72 is somewhat vertically disposed and it is mounted between vertical angle irons 74 which are attached to and rise from the angle irons of the aforementioned frame. In this connection appropriate diagonal braces 76 are also provided.

Attention is called at this time to an elongate rectangular bar 78 which is treated as a valving or gate bar. This is interposed between the entrance of the passage 70 and the discharge slot, or in the space, let us say, between the wall 60 and the upstanding end portions of the angle iron 74. It is adjustable toward and from the slot and therefore permits the effectiveness of this discharge slot to be regulated or controlled. In order to raise and lower the gate bar relative to the discharge slot, simple mechanical adjusting devices are provided. That is to say, T-shaped rods are arranged at opposite ends of the bar and these are denoted at 80 and have suitable handles 82 on their upper ends. The lower ends are screw threaded at 84 and are, in turn, adjustably screwed into screw threaded sockets 86 (see Fig. 5) provided therefor. The intermediate portions of the rods are non-threaded and are swiveled for free rotation in guide bushings 88 which are welded or otherwise fixedly secured to the angle irons 72. Upper and lower assembling and retaining collars 90 and 92 are fixed to each rod 80 (Fig. 5). Therefore, the valving or gate bar 78 is adjustably suspended by way of the swivelly mounted T-rods 80. The latter may be turned by hand to raise and lower said gate bar. Obviously, by properly valving and regulating the effective size of discharge slot 64 by suitably adjusting the stated gate bar or valve 78, the user may effectually slow down or speed up the shredding step depending to some extent upon the coarseness and toughness of the bale being handled. Hence, the likelihood of the machine or apparatus jamming from an overload or stress and strain is minimized.

This improved machine or apparatus, sometimes referred to as a debaler, is constructed and designed, as before stated, for the purpose of breaking up, loosening and fluffing up baled material such as alfalfa, hay, straw and so on, all in a manner to eliminate the undesirable and tedious job of breaking up and pulling apart the components by hand or with a pitchfork. The construction is such that it will serve to handle bales setting on end or lying down horizontally, if so desired. The revolving toothed drum or cylinder effectually serves to rake or pull the material steadily and evenly off the bottom or lower portion of the bale which, in practice, actually rests or lies on the revolving drum as is obvious from the illustration in the drawing. The loosened material is forced under the gate valve by way of the discharged slot, which controls the rate of feed, and the then shredded material drops down through the passageway between the shield and the drum for feeding, grinding, bedding and so on.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. For use in holding, gravity-feeding and shredding a compressed bale of hay, straw, or the like, a disintegrating apparatus comprising, in combination, a stationary support structure embodying a leg supported frame having bearings, a horizontally disposed shaft journaled for rotation in said bearings, a disintegrating drum fixed to and carried by said shaft, said drum having a cylindrical surface studded with radial bale disintegrating teeth, a vertical hanger fixed on and depending from a cooperating portion of said frame, a bracket at right angles to and hinged on said hanger, an electric motor operatively supported on said bracket, a horizontal motion transmitting shaft mounted for rotation on said frame in a plane above said hanger and centrally and directly above said bracket, said shaft being provided with a pulley and a sprocket wheel, said motor having a motion delivering shaft with a pulley, a belt trained over said pulleys, said first named shaft being provided with a sprocket wheel, a sprocket chain trained over and operating the sprocket wheels, and a hopper mounted on said frame and having open upper and lower ends and being communicable with said drum, said hopper being rectangular, of a cross-section such that the lower open end cooperates with approximately a one-quarter portion of the surface of the drum, one wall of said hopper being provided with a discharge slot, and a shield cooperating with an adjacent quarter portion of said drum and opposed in parallelism to and communicatively cooperating with said slot, and valving means interposed and adjustably and operatively mounted between the shield and slot for regulating the discharge of material by way of the slot into the space existing between said shield and the cooperating surface of the drum.

2. For use in holding, gravity-feeding and shredding a compressed bale of hay, straw, or the like, a disintegrating apparatus comprising, stationary support means, a horizontally disposed drum mounted for rotation on said support means and embodying a cylinder having a bale shredding surface studded with radial bale disintegrating teeth, a prime mover, an operating connection between said prime mover and drum, a vertically disposed hopper in which said bale is placed and allowed to gravitate downwardly toward said shredding surface, said hopper being fastened to said support means, and being open at its upper and lower ends, said lower end being in close operating proximity to a cooperating surface portion of said drum, said hopper being rectangular in cross-section, of a cross-sectional dimension approximately equal to one quarter of the circumference of said drum and embodying a long rear vertical wall secured at its lower end to said support means, an opposed short vertical front wall whose lower end parallels but is spaced upward from the cooperating drum surface to provide a shredded hay discharge slot between the lower end of said front wall and cooperating surface portions of said drum, and a pair of vertical side walls whose lower ends are arcuately cut and conformable in curvature to the curvature of the stated surface of said drum, a wall-like shield complemental to said hopper and drum and cooperating with and hooding over and substantially covering a cooperating underlying one-quarter surface portion of said drum and occupying a fixed position in spaced parallelism relative to said underlying surface portion, said shield being arcuate in form and extending upwardly from said support means toward and having an upper portion disposed in spaced parallelism relative to the lower portion of the front wall of said hopper and providing a gate bar accommodation space, a gate bar located for operation in said space and vertically adjustable and movable radially toward and from the surface portion of said drum and cooperable with said slot in a manner to valve and otherwise change the effective size of the slot relative to the surface portion of the drum, rods swivelly mounted between the upper portion of the shield and front wall of said hopper, said rods depending into said space, and means affording an adjustable connection between the lower ends of said rods and cooperating end portions of said gate bar, whereby manual adjustment of the rods serves to lift and lower and regulate the position of the bar relative to the surface of the drum and said slot.

(References on following page)

References Cited in the file of this patent

UNITED STATES PATENTS

| | | |
|---|---|---|
| 100,302 | Lyons | Mar. 1, 1870 |
| 1,308,007 | Forsyth | June 24, 1919 |
| 1,769,806 | Spencer | July 1, 1930 |
| 1,905,152 | Clinton et al. | Apr. 25, 1933 |
| 2,136,214 | Keith | Nov. 8, 1938 |
| 2,275,121 | Wingate | Mar. 3, 1942 |
| 2,297,604 | Bateman | Sept. 29, 1942 |